(12) United States Patent
Kim et al.

(10) Patent No.: US 11,310,734 B2
(45) Date of Patent: Apr. 19, 2022

(54) METHOD AND DEVICE FOR SELECTING RECEPTION POINT AND TRANSMISSION POINT IN WIRELESS COMMUNICATION SYSTEM

(71) Applicant: Samsung Electronics Co., Ltd., Suwon-si (KR)

(72) Inventors: Hyesuk Kim, Suwon-si (KR); Sungbum Park, Seoul (KR); Soonyoung Lee, Seoul (KR); Minsung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 16/484,644

(22) PCT Filed: Mar. 13, 2017

(86) PCT No.: PCT/KR2017/002663
§ 371 (c)(1),
(2) Date: Aug. 8, 2019

(87) PCT Pub. No.: WO2018/147501
PCT Pub. Date: Aug. 16, 2018

(65) Prior Publication Data
US 2019/0380090 A1 Dec. 12, 2019

(30) Foreign Application Priority Data

Feb. 10, 2017 (KR) .................. 10-2017-0018851

(51) Int. Cl.
*H04W 48/20* (2009.01)
*H04B 17/23* (2015.01)
(Continued)

(52) U.S. Cl.
CPC ............ *H04W 48/20* (2013.01); *H04B 17/23* (2015.01); *H04B 17/27* (2015.01); *H04B 17/30* (2015.01);
(Continued)

(58) Field of Classification Search
CPC ... H04W 72/10; H04W 72/085; H04W 48/20; H04W 16/18; H04B 17/30; H04B 17/23; H04B 17/27
See application file for complete search history.

(56) References Cited

U.S. PATENT DOCUMENTS

2008/0224930 A1   9/2008   Chizhik et al.
2009/0102707 A1   4/2009   Elwell, Jr. et al.
(Continued)

FOREIGN PATENT DOCUMENTS

KR   10-2008-0105369 A   12/2008
KR   10-2009-0011114 A   2/2009

OTHER PUBLICATIONS

Unbehaun et al., On the Deployment of Picocellular Wireless Infrastructure, 2003. (Year: 2003).*
(Continued)

*Primary Examiner* — Oussama Roudani
(74) *Attorney, Agent, or Firm* — Jefferson IP Law, LLP

(57) ABSTRACT

Disclosed are a communication technique of merging, with IoT technology, a 5G communication system for supporting a data transmission rate higher than that of a 4G system, and a system therefor. The disclosure can be applied to intelligent services (for example, smart home, smart building, smart city, smart car or connected car, health care, digital education, retail, security and safety related services, and the like) on the basis of 5G communication technology and an IoT-related technology. A method for selecting a transmission point in a wireless communication system, according to (Continued)

an embodiment of the present specification, comprises the steps of: setting a transmission point group including at least one transmission point, on the basis of at least one reception point; setting a priority for the at least one transmission point in the transmission point group; and selecting a transmission point. The present research has been performed by receiving support from "Giga KOREA project" of the Ministry of Science, ICT, and Future Planning

15 Claims, 19 Drawing Sheets

(51) Int. Cl.
  *H04B 17/27* (2015.01)
  *H04B 17/30* (2015.01)
  *H04W 16/18* (2009.01)
  *H04W 72/08* (2009.01)
  *H04W 72/10* (2009.01)
(52) U.S. Cl.
  CPC ......... *H04W 16/18* (2013.01); *H04W 72/085* (2013.01); *H04W 72/10* (2013.01)

(56) References Cited

U.S. PATENT DOCUMENTS

| | | | |
|---|---|---|---|
| 2010/0076730 A1* | 3/2010 | Yonezawa | G06F 30/20 703/1 |
| 2010/0211912 A1* | 8/2010 | Williams | G06Q 50/265 715/810 |
| 2010/0250221 A1 | 9/2010 | Kim et al. | |
| 2014/0018084 A1 | 1/2014 | Sato et al. | |
| 2016/0013822 A1* | 1/2016 | Polehn | G01S 13/04 455/63.1 |
| 2017/0201976 A1* | 7/2017 | Yue | H04W 4/025 |
| 2017/0338901 A1* | 11/2017 | Zhihua | H04B 17/3913 |

OTHER PUBLICATIONS

Unbehaun M et al: "On the Development of Picocellular Wireless Infrastructure", Technical Report of Wireless Networking Group, Coordinated Science Laboratory; Dept. Electrical and Computer Engineering; University of Illinois at Urbana-Champaign, US, vol. 10, No. 6, Dec. 1, 2003 (Dec. 1, 2003), pp. 70-80, XP001186126, ISSN: 1536-1284, DOI: 10.1109/MWC.2003.1265855 Dec. 1, 2003.

European Search Report dated Dec. 16, 2019, issued in European Patent Application No. 17896312.0.

T.Colleu, 'Ray-Based Detection of Openings in Urban Areas Using Mobile Lidar Data', The International Archives of the Photogrammetry, Remote Sensing and Spatial Information Sciences, vol. XLI-B3, ISPRS Congress, Prague, Czech Republic, Jun. 9, 2016 (URL: https://www.int-arch-photogramm-remotesens-spatial-inf-sci.net/XLI-B3/591/2016/).

Zhongquang Chen , 'Radio-Wave Propagation Prediction using Ray-Tracing Techniques on a Network of Workstations (NOW)', Journal of Parallel and Distributed Computing, vol. 64, Issue 10, pp. 1127-1156, Oct. 31, 2004 (URL:http://www.sciencedirect.com/science/article/pii/S0743731504001297).

* cited by examiner

|  | Method #0 (minimum cost) | Method #1 (MDU) | Method #2 (SFU) | Manual | ... |
|---|---|---|---|---|---|
| Existing site | 1 | 1 | 1 | ... | |
| Utility Pole | 2 | 2 | 3 | ... | |
| Roof Top | 2 | 3 | 5 | | |
| Light Pole | 2 | 4 | | | |
| existing tower | 1 | 5 | | | |
| new pole | 3 | | | | |
| ... | | | | | |

METHOD AND DEVICE FOR SELECTING RECEPTION POINT AND TRANSMISSION POINT IN WIRELESS COMMUNICATION SYSTEM

TECHNICAL FIELD

The disclosure relates to a method and apparatus for selecting a reception point and a transmission point using image information and central office information in network design.

This study has been carried out with the support from the "Giga KOREA Project" of the Ministry of Science, ICT, and Future Planning.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system". To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like. In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

As such, a method is required for estimating the channel environment and designing networks in the 5G communication system. Through network design, to enable network services over wireless communication in a particular area, the location of a transmitter (Tx) that transmits radio frequency (RF) signals and configuration values for transmission can be determined, various information on RF signals at the location of a receiver (Rx) can be identified, the channel environment can be analyzed based on mathematical modeling techniques or ray tracing simulation results, and thus the optimal Tx location can be determined. In this way, various RF signal information (e.g., path loss, coverage) can be provided for analyzing the channel environment, and the network design can be performed based on the provided information. According to an embodiment, mathematical modeling techniques may include empirical modeling techniques.

FIG. 1 illustrates network design using a mathematical modeling technique.

In FIG. 1, the transmitters 110 and 120 may form transmission beams 112 and 122 to transmit signals.

In such a mathematical modeling technique, RF information can be predicted by use of a function explicitly represented through specific signal transmission and reception modeling based on the frequency and distance of a transmission signal. As shown in the figure, each transmitter 110 or 120 can form beams 112 or 122 in three directions, and the RF characteristics of a transmission signal can be applied through the modeling technique. In this way, the RF information can be predicted through the mathematical modeling technique with a small amount of calculation, but the accuracy of such modeling may be poor for high frequency RF signals.

To analyze the channel characteristics of high frequency RF signals, a simulation technique using ray tracing can be considered. Here, the channel environment can be analyzed in consideration of the possible paths along which the RF signal can be transmitted. However, this can increase the amount of computation, and a method is needed that can reflect the actual environment in the simulation to ensure accuracy.

DISCLOSURE OF INVENTION

Technical Problem

Accordingly, embodiments of the disclosure are to provide a method and apparatus for efficiently determining the location of a reception point (Rx point) and a transmission point (Tx point) in network design through an analysis of RF transmission and reception environments.

Solution to Problem

According to an embodiment of the disclosure, there is provided a method for selecting a transmission point (TX point) in a wireless communication system. The method may include: extracting at least one reception point (RX point) based on image information in a map; forming a transmission point group including at least one transmission point based on the at least one reception point; and assigning a priority for at least one transmission point in the transmission point group and selecting a transmission point according to the assigned priority.

Extracting at least one reception point may include: identifying shape information of a first object located in the map based on the image information; identifying characteristic information of a second object included in the first object; and selecting the second object as the reception point based on the shape information and the characteristic information.

The shape information may include information about at least one of the height, the size, or the shape of the first object. The characteristic information may include information about at least one of the height, the size, the number, or the position of the second object. The second object may be an object having a transmittance for radio waves lower than a threshold value.

The priority may be assigned based on at least one of the distribution of multi-dwelling units (MDU) in the map, the distribution of single-family units (SFU) in the map, the installation cost of the transmission point, the number of transmission points to be installed, the location of previously installed transmission points, or a user input (i.e., explicit prioritization of the user).

Forming a transmission point group may include: examining installation information of the at least one reception point; configuring a surrounding region for the at least one reception point based on the installation information; and selecting at least one transmission point from among plural transmission points based on the surrounding region and the transmission coverage of each of the transmission points.

Forming a transmission point group may further include: comparing a first location of a previously installed transmission point with a second location of the at least one transmission point; and configuring the previously installed transmission point as the at least one transmission point if the second location is replaceable with the first location according to the comparison result.

Selecting a transmission point may include: generating combinations for the at least one transmission point from the transmission point group according to the priority; calculating a weight for each of the combinations; selecting a first combination having the highest weight among the combinations; and selecting, if the transmission coverage of the first combination covers the reception area corresponding to the at least one reception point, the first combination as the transmission point.

Selecting a transmission point may include: selecting, if the transmission coverage of the first combination does not cover the reception area corresponding to the at least one reception point, a second combination having the second highest weight among the combinations; and selecting, if the transmission coverage of the second combination covers the reception area corresponding to the at least one reception point, the second combination as the transmission point.

According to an embodiment of the disclosure, there is provided an apparatus for selecting a transmission point (TX point) in a wireless communication system. The apparatus may include: a transceiver configured to transmit and receive information; and a controller configured to extract at least one reception point (RX point) based on image information in a map, form a transmission point group including at least one transmission point based on the at least one reception point, assign a priority for at least one transmission point in the transmission point group, and select a transmission point according to the assigned priority.

Advantageous Effects of Invention

According to an embodiment of the disclosure, it is possible to efficiently determine the location of a reception point (RX point) and a transmission point (TX point) in network design through an analysis of RF transmission environments.

According to an embodiment of the disclosure, by automatically generating optimal RX/TX candidates based on image information and central office information, user convenience can be increased and the time required for the simulation step in network design can be reduced.

MODE FOR THE INVENTION

Figure 1:
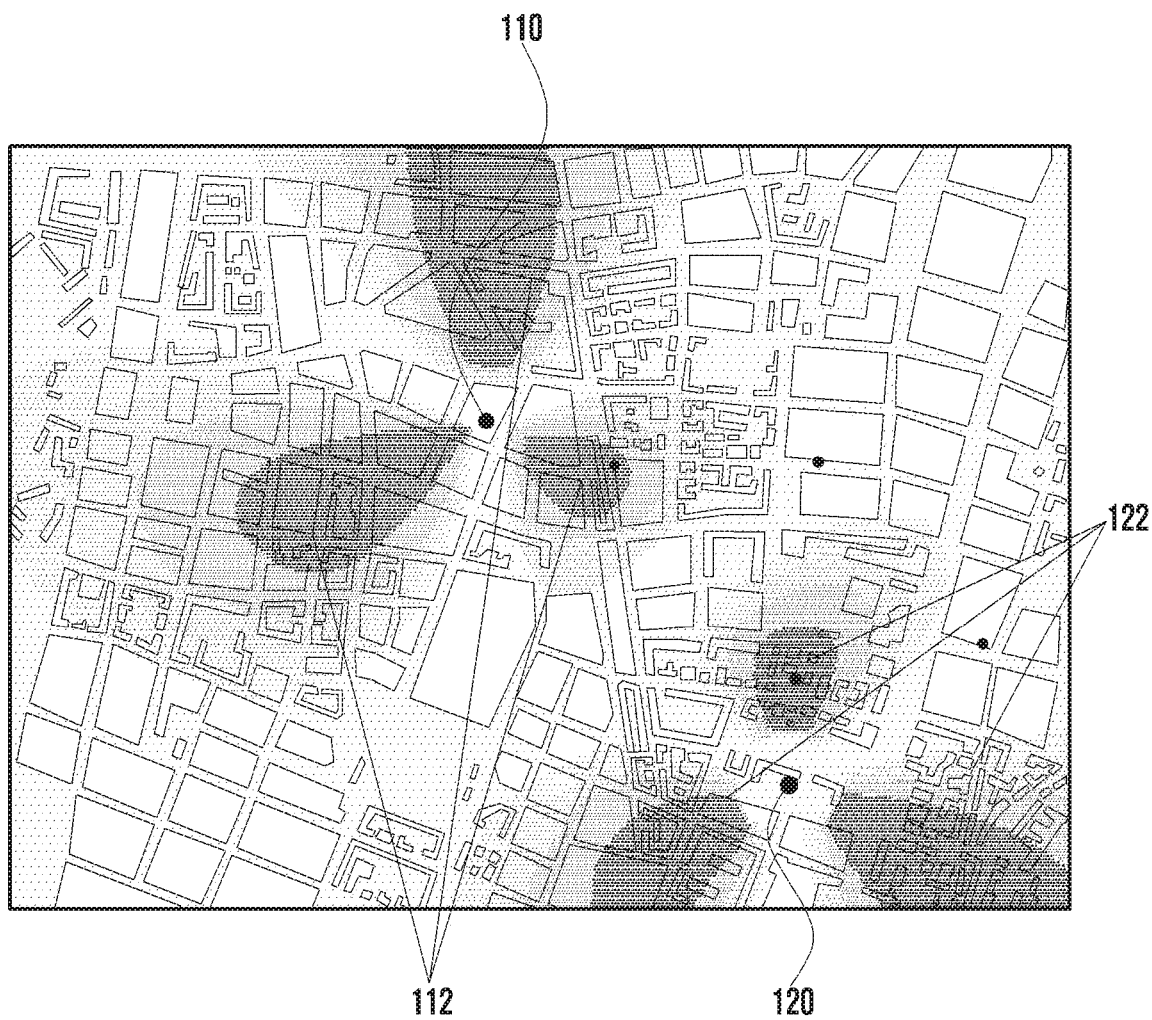
FIG. 1 illustrates network design using a mathematical modeling technique.

Hereinafter, embodiments of the disclosure are described in detail with reference to the accompanying drawings.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In a drawing depicting a method for an embodiment, the order in which steps or operations are listed does not necessarily correspond to the order in which they are performed, and two steps listed in sequence may be executed in reverse order or executed in parallel. Also, the steps not mentioned as essential in an embodiment may be selectively performed.

Figure 2:
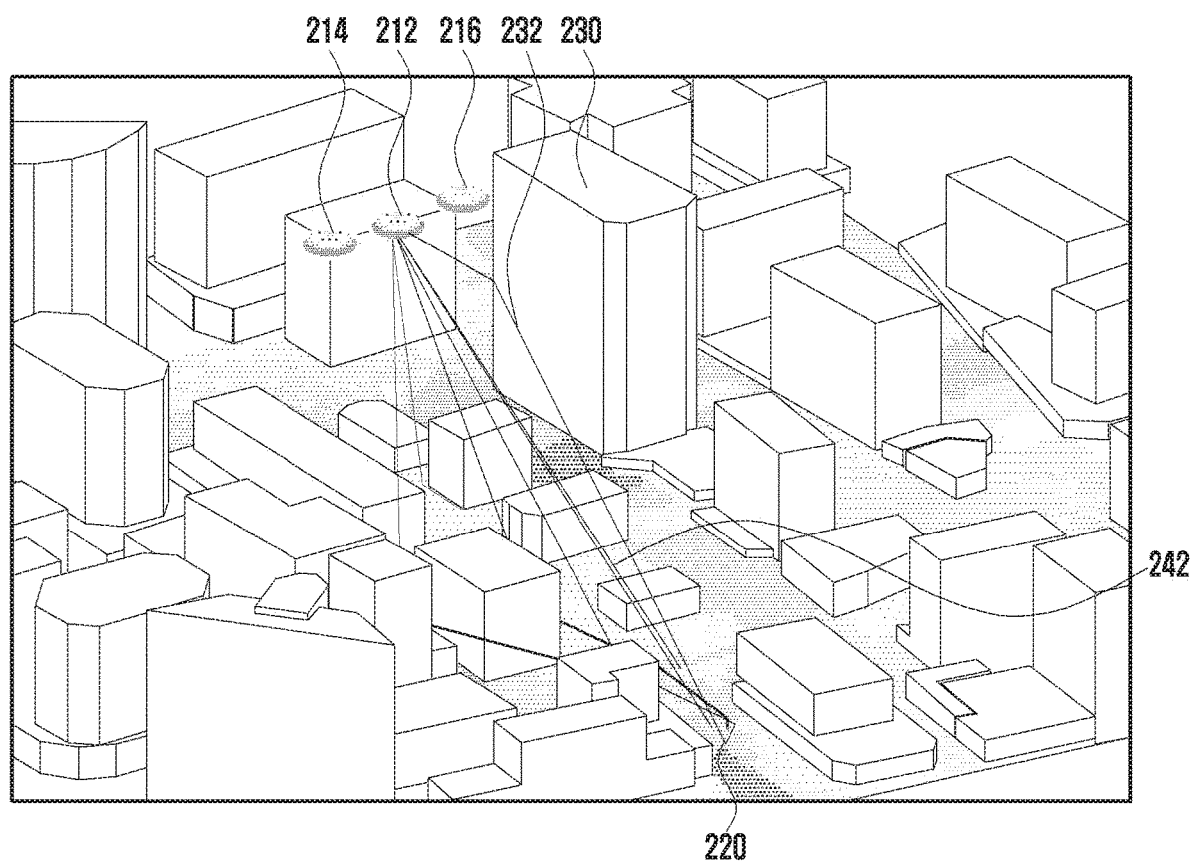
FIG. 2 illustrates a ray tracing simulation scheme according to an embodiment of the disclosure.

FIG. 2 illustrates a ray tracing simulation scheme according to an embodiment of the disclosure.

In FIG. 2, it is assumed that one or more transmitters 212, 214 and 216 transmit signals, and the strength of the signals transmitted by the transmitters 212, 214 and 216 is represented in light and shade on the map. The darker shade indicates stronger signal strength, and the lighter shade indicates weaker signal strength.

More specifically, based on the location of the receiver 220, it is possible to determine the reception strength of the signal in the corresponding region. It is also possible to identify the transmission channel for each possible path from one transmitter 212 to the receiver 220. There may be a signal 242 that is directly received by the receiver 220 from the transmitter 212 and a signal 232 that is reflected by a different object 230 and is received by the receiver 220. By performing a simulation based on ray tracing, it is possible to obtain information about the reception strength of the signals from the transmitters 212, 214 and 216 in a specific region and the propagation paths of the signals. When determining the signal reception strength along the propagation path of the signal, the receiver 220 can obtain more accurate signal reception information if at least one of the surface material or the external shape of the signal reflecting object is considered. Here, the surface material does not only mean the outer surface of the object but also may include the inner material that may affect the reflection of the radio wave. Such information can be used to more accurately estimate the characteristics of radio wave reflection.

In addition, a radio wave-transmissible obstacle may be located on the path along which the signal is directly transmitted. An example of such an obstacle may be a tree. An obstacle that can transmit the radio wave but causes signal attenuation like a tree can be considered in the ray tracing simulation. More accurate simulation results can be obtained by considering information about the obstacles capable of transmitting the radio wave. Here, the tree is an example of an obstacle that is located on the signal propagation path and causes signal attenuation during radio wave transmission, and the obstacle may be a plant or a structure installed on the propagation path and may also be a different object that may cause signal attenuation.

By performing a ray tracing simulation in this way, at least one of the optimum transmitter position or the optimum receiver position can be determined on the map. According to an embodiment, the ray tracing simulation may be performed in consideration of a plurality of transmitter position candidates and receiver position candidates, and it is possible to determine at least one of the transmitter position or the receiver position according to the ray tracing results.

In this manner, the ray tracing simulation can be used to determine the transmission channel for each of the paths through which the RF signal passes, and predict RF signal information at the position of the receiver 220 based on the simulation results. In the process of determining the channel environment along the signal path, the ray tracing simulation may calculate at least one of the signal propagation distance, the environment of a path (e.g., type of the medium), and the effects of reflection and diffraction caused by the 3D terrain or buildings, thereby producing more accurate RF signal information. Additionally, the above channel estimation technique does not have any limitation due to the frequency of the RF signal, can accurately reflect the actual environment, and can be used to determine at least one of the optimal transmission position or the optimal reception position based on the simulation results.

5G networks use very high frequency signals of 28 to 60 GHz. Hence, it is possible to improve accuracy in 5G network design by using a ray tracing simulation technique, not a mathematical modeling technique, to obtain radio signal information. In the ray tracing simulation, to estimate the reflected path of the radio wave due to a building, the reflection effect may be calculated by assuming that the surfaces of all buildings have the same RF characteristics. However, since the reflectance of the RF signal differs depending on the surface material, external shape and pattern of the reflection surfaces, this assumption does not guarantee accurate simulation results. Therefore, a ray tracing technique considering this information is required.

Figure 3A:
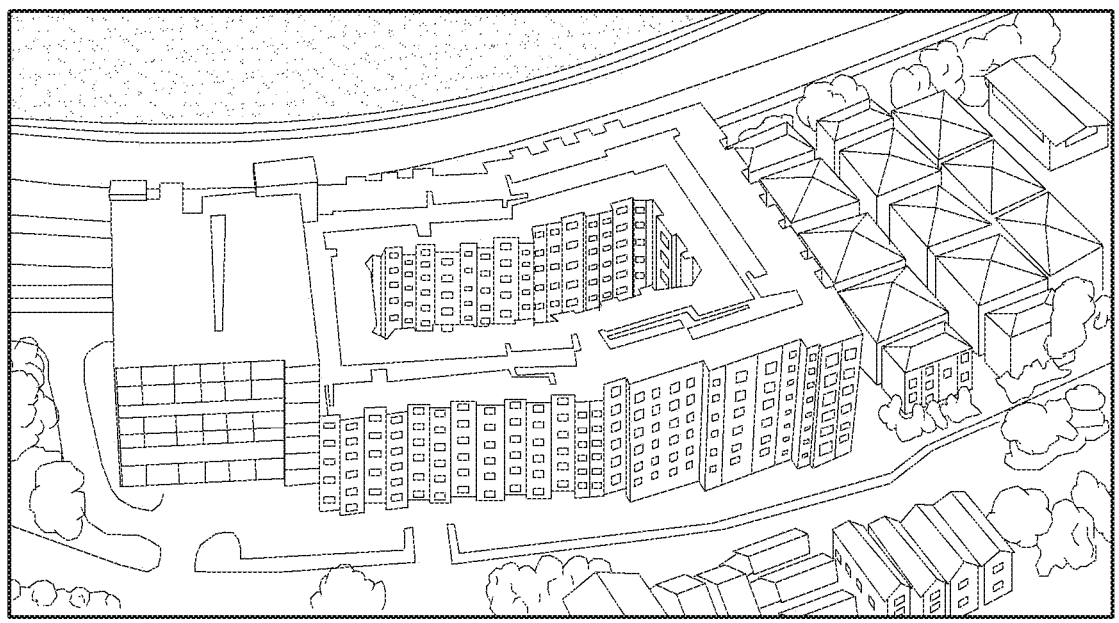
FIGS. 3A and 3B illustrate a scheme for obtaining three-dimensional map information according to an embodiment of the disclosure.
Figure 3B:
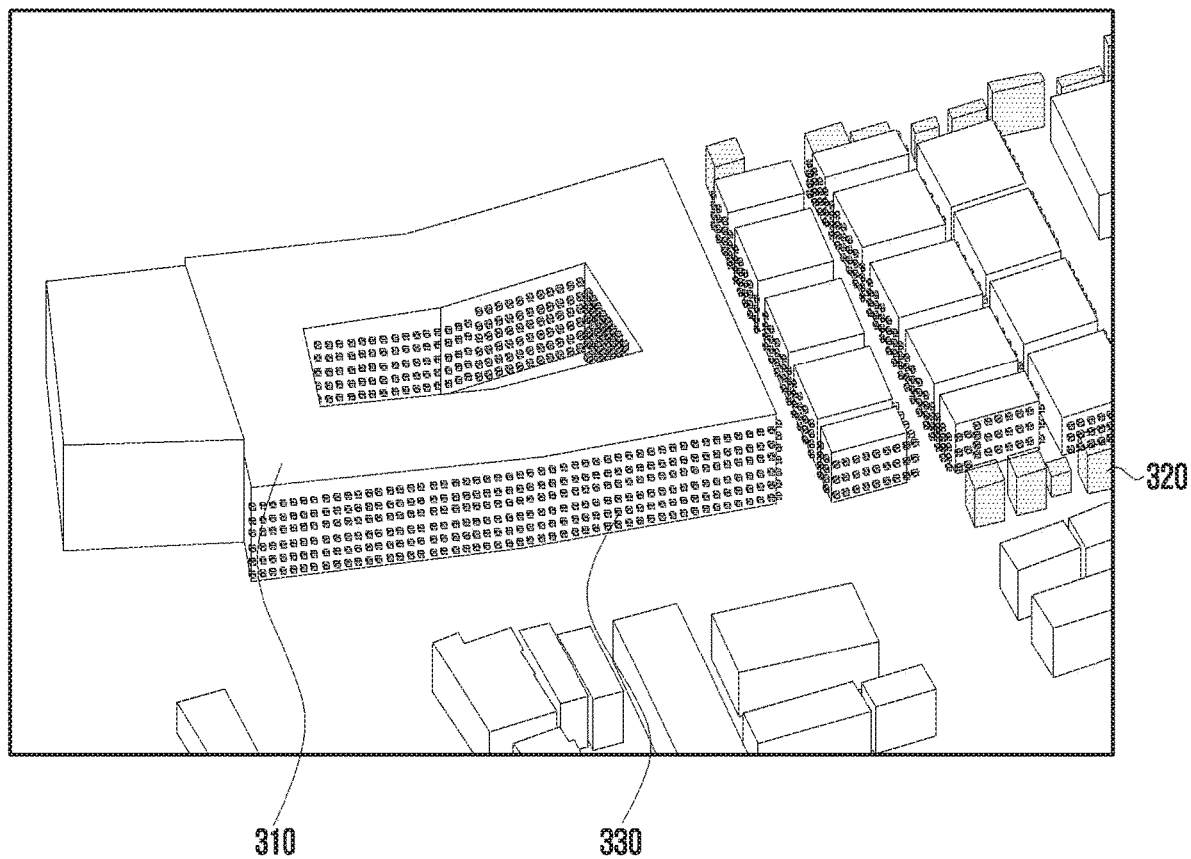

FIGS. 3A and 3B illustrate a scheme for obtaining three-dimensional map information according to an embodiment of the disclosure.

With reference to FIGS. 3A and 3B, three-dimensional map information can be obtained based on the actual image information of FIG. 3A and the location information corresponding to the image information. More specifically, the 3D map information of FIG. 3B can be obtained so that the ray tracing simulation can be performed based on the image information.

The obtained map information of FIG. 3B may include buildings 310, receiver candidate regions 330, and trees 320. Thus, the transmitter position candidates and the receiver position candidates can be determined based on the obtained map information, and the ray tracing simulation can be performed to determine at least one of the optimum transmitter position or the optimum receiver position.

In one embodiment, objects such as a building 310 may have the characteristics of reflecting or scattering radio waves. In this case, more precise simulation results can be obtained by considering the surface material and external shape thereof.

In one embodiment, in the case of a tree 320, although the radio wave can be transmitted, the transmitted radio wave may experience a larger signal attenuation compared with the air. Thus, more accurate simulation results can be obtained by considering the characteristics of the radio wave propagating through an object like the tree 320.

In one embodiment, the receiver candidate region 330 may be selectively considered according to ray tracing and may include a portion where a fixed or mobile receiver can be installed. More specifically, a receiver may be installed at a window portion of the building 310, and the receiver installed in the window portion can perform a relay function in communication between the transmitter outside the building and another receiver inside the building. Thus, by performing the ray tracing simulation in consideration of the receiver candidate region 330, it is possible to obtain a result reflecting a better signal reception environment.

Figure 4A:
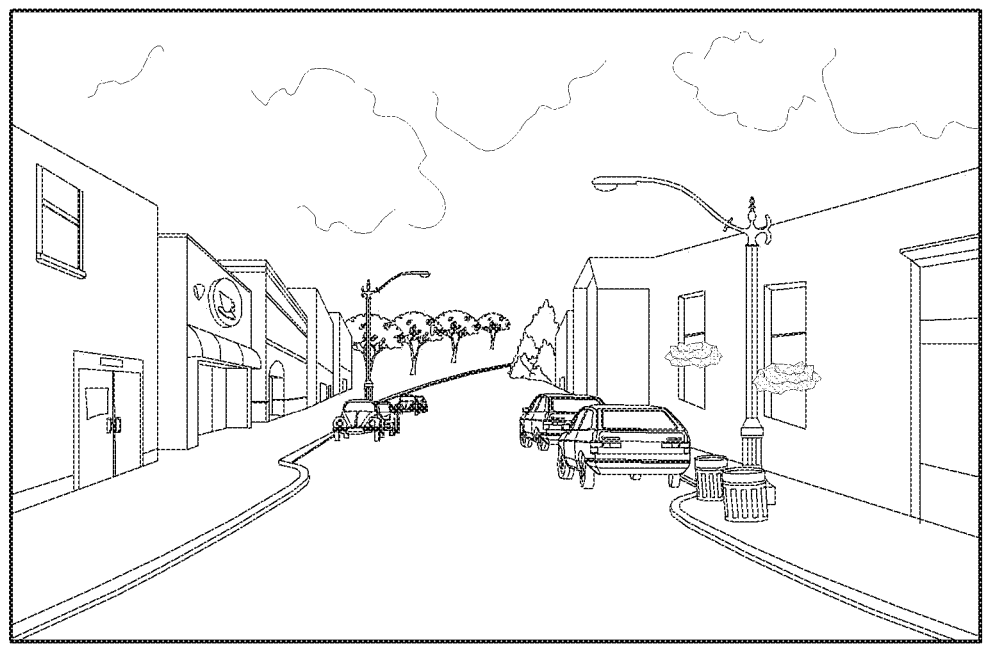
FIGS. 4A and 4B illustrate a scheme for obtaining material information of objects in an image using image information according to an embodiment of the disclosure.
Figure 4B:
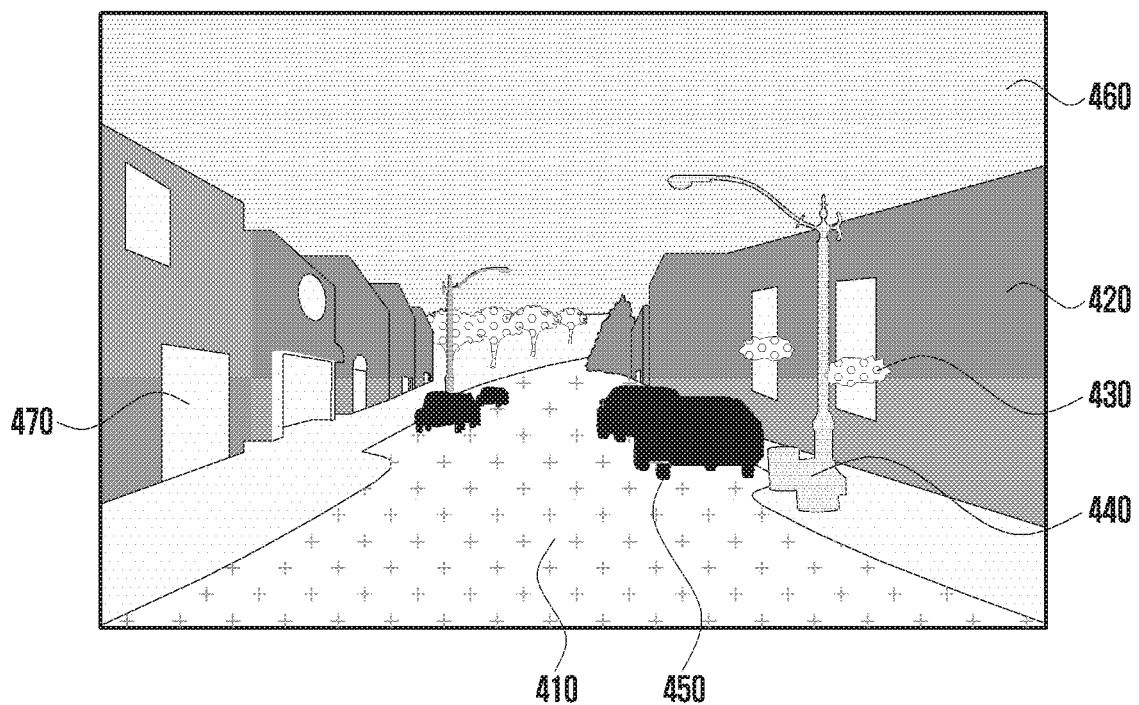

FIGS. 4A and 4B illustrate a scheme for obtaining material information of objects in an image using image information according to an embodiment of the disclosure.

With reference to FIGS. 4A and 4B, the material of an object in the image can be identified from the image information. More specifically, it is possible to identify the material of an object in the image from the image information by use of computer vision technology based on deep learning. More specific features related to deep learning-based computer vision technology will be described later.

In one embodiment, the result of FIG. 4B can be obtained by analyzing the image information of FIG. 4A. Here, each element can be identified based on at least one of color, contrast, reflectance, mutual positional relationship between elements, or arrangement of all the elements, represented in the image. For example, image analysis can be used to identify the material of elements such as asphalt 410, concrete 420, plant 430, steel structure 440, vehicle 450, sky 460, and glass 470. As such, the material of the elements represented in the image may be determined based on the image information, and more accurate results can be obtained by reflecting the material characteristics in the ray tracing simulation.

Figure 5:
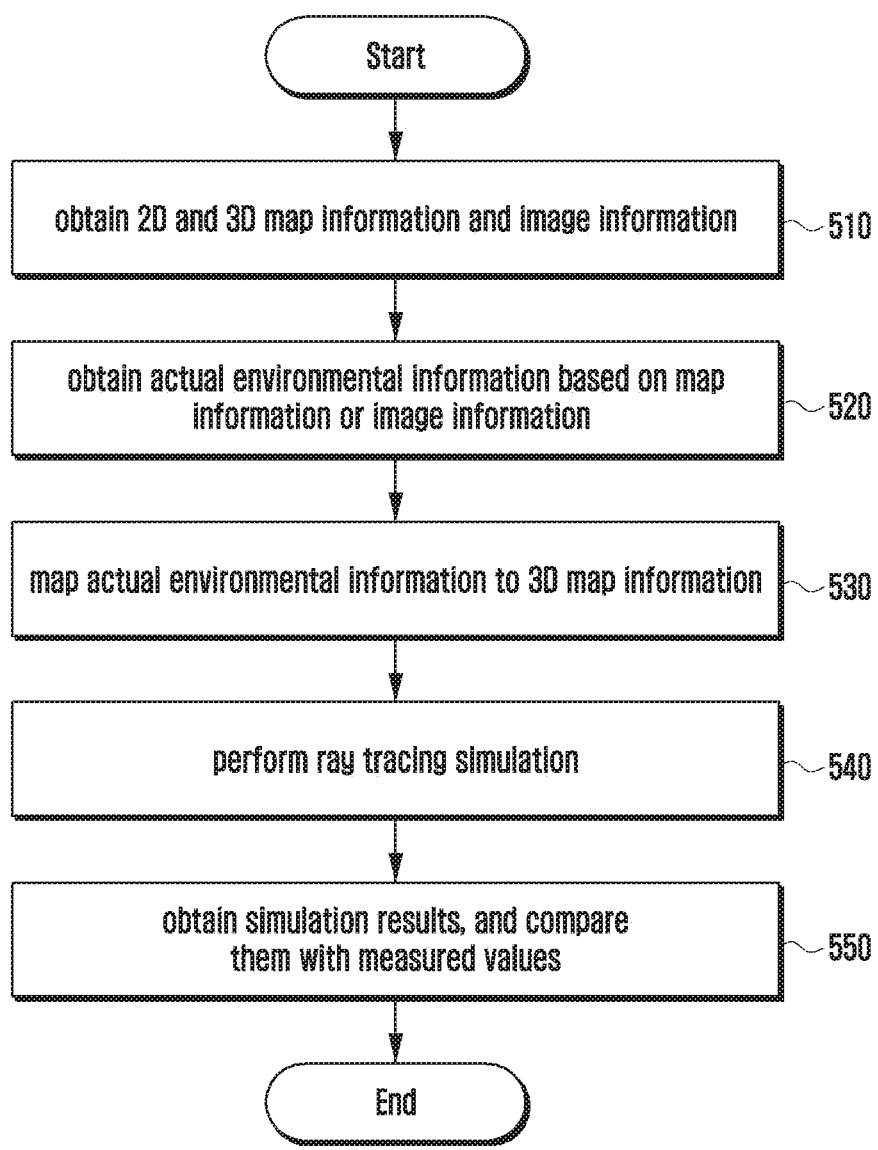
FIG. 5 describes a method for analyzing communication channel environments through ray tracing according to an embodiment of the disclosure.

FIG. 5 describes a method for analyzing communication channel environments through ray tracing according to an embodiment of the disclosure.

A description is given of a method for performing a ray tracing simulation with reference to FIG. 5. In one embodiment, the ray tracing simulation may be performed by a computing device including a controller. The computing device may be a device including a central control processor, and may be a personal computer, a workstation, or the like. In the following description, it may be assumed that the simulation is performed by a computing device.

At step 510, the computing device can obtain two-dimensional image information and three-dimensional map information. In one embodiment, the two-dimensional image information may include additional information corresponding to the image, and the additional information may include shooting information about the position, direction, and angle of view at which the image is captured. The three-dimensional map information corresponding to the two-dimensional image information can be identified based on the additional information. The three-dimensional map information may include position information and corresponding three-dimensional information. Such information may include information about the shapes of buildings, structures, and plants on the ground surface or water surface, and may further include information about at least one of transmitter position candidates or receiver position candidates according to an embodiment.

At step 520, the computing device may obtain actual environmental information based on at least one of the map information or the image information. The actual environmental information may include information about objects and characteristics thereof located on the communication path. More specifically, the two-dimensional image information can be analyzed to identify the characteristics of objects that can be located on the communication path. The characteristics of an object may include at least one of the surface material of the object or the external shape of the object. In the case of an object capable of transmitting the radio wave, the characteristics of the object may include information about the shape of the object and the degree of signal attenuation during transmission.

At step 530, the computing device may map the actual environmental information of the communication path to the three-dimensional map information based on the information obtained at steps 510 and 520. In this mapping, the additional information obtained from the two-dimensional image information may be mapped to the object corresponding to the three-dimensional map information based on the additional information included in the two-dimensional image information.

At step 540, the computing device may perform a ray tracing simulation based on the information generated at step 530. In one embodiment, the ray tracing simulation may be performed while changing the beam information in sequence with respect to the beam in a specific direction, or may be performed by assuming that beams in all directions that can be transmitted by the transmitter are transmitted within the same time period. Through the ray tracing simulation, it is possible to predict and analyze the quality of the signal that can be received by the receiver in consideration of the path through which the signal is transmitted from the transmitter to the receiver and the actual environmental information along the path. In one embodiment, during the ray tracing simulation, at least one of the transmitter position or the receiver position may be determined based on the three-dimensional map information, and the signal transmission environment can be identified based on the information mapped at step 530.

At step 550, the computing device may obtain the simulation results, and may continue the ray tracing simulation according to the value obtained through the simulation and the value obtained through measurement in the actual environment. More specifically, if the simulation result value is different from the measurement value, the computing device may newly generate the simulation result value by changing the information obtained at step 520 based on the actual measurement value. In this way, the ray tracing simulation may be performed by reflecting the actual environmental information on the three-dimensional map, enabling a more reliable analysis of the communication channel For example, a transmitter and a receiver may be directly installed in the region for the ray tracing simulation, and the signal transmitted from the transmitter to the receiver may be measured. This measurement result can be added to the basic information for carrying out the ray tracing simulation, updating the basic information.

As described above, to provide a wireless service to a specific region in the map, it is possible to determine at least one of the optimal transmitter position or the optimal receiver position based on the ray tracing simulation results. Effective network design can be performed through determining at least one of the optimal transmitter position or the optimal receiver position. For example, it is possible to determine an optimum base station position for effectively providing radio signals to wireless terminals in a specific region. By determining the optimal base station position, it is possible to effectively provide services with a smaller number of base station installations.

In addition, adaptive network management can be possible by use of information on signal reception measured in an actual environment. More specifically, when there is a change in the surrounding environment after the transmitter is installed, an additional ray tracing simulation may be performed in consideration of the changed environment. Network management may be performed by adjusting the transmitter position based on the simulation results. In addition to adjusting the transmitter position, the network management may include modifying the information about the beams emitted by the transmitter. For example, the transmitter can determine the transmission beam and the reception beam based on the ray tracing simulation results. Beam alignment may be performed based on the ray tracing simulation results to determine the transmission beam and the reception beam. Such adaptive network management can be performed on a periodic basis.

Meanwhile, the network design system is a system for selecting the optimal positions and number of base stations to cover a given service area. To optimally configure a base station, the user may directly set a base station position on the graphical interface of the network design system based on visual judgment; or a base station may be set in the target region, the terrain design may be performed, and the propagation analysis may be performed to confirm whether the position of the base station is properly set.

For automatically selecting a base station to avoid inefficient aspects of human resources, the optimum positions and number of base stations can be selected in consideration of the coverage of the base station, local radio environment (propagation distance, frequency band, distribution of obstacles on the propagation path, height of buildings or obstacles, height of the base station antenna, and height of the mobile station), and the call volume (number of subscribers per unit area). Finally, to designate the location of a terminal, the area can be divided into cells according to preset criteria (call volume, area size, etc.) and a simulation can be performed based on the coverage of each cell.

The manual method, where the user directly checks the radio environment of the base station, set the location thereof, and perform terrain deign, may be relatively more accurate than the method of automatically selecting the base station. However, this manual method may fail to examine a specific area, and may take a long time and be very inefficient in terms of human resources.

To optimally select the locations and number of base stations in consideration of the radio environment and the call volume in an area, the information about the radio environment and the call volume of the area must be provided. Providing information only on the location of the base station to be newly installed without considering the existing installed base stations may cause inefficiency in terms of installation and cost. Also, accuracy may be impaired if the characteristics of the real environment or user's intent (complex multi-family houses, single-family villas, minimum number, or minimum cost) are not reflected.

In the related art, as the location of the terminal is represented not by the accurate position but by cells divided according to certain criteria, the simulation is calculated on the basis of the cell coverage, and there may be a significant difference between the simulation result and the actual network design result.

The disclosure relates to a method of generating RX/TX position candidates required for the ray tracing simulation step in network design, and relates to a method for automatically generating RX/TX position candidates according to user's prioritization in consideration of image information recognition through deep learning and information on existing TX installations (or central office information).

That is, in the disclosure, the optimal RX/TX candidate is automatically generated by utilizing the image information and central office information, thereby enhancing the user convenience and reducing the time required for the simulation step in network design.

In the description, the transmission (TX) point may refer to the location of the transmitter in a wireless communication system, e.g., the location where the base station is installed, and the reception (RX) point may refer to the location of the receiver in the wireless communication system, e.g., the location where the terminal is installed.

Figure 6:
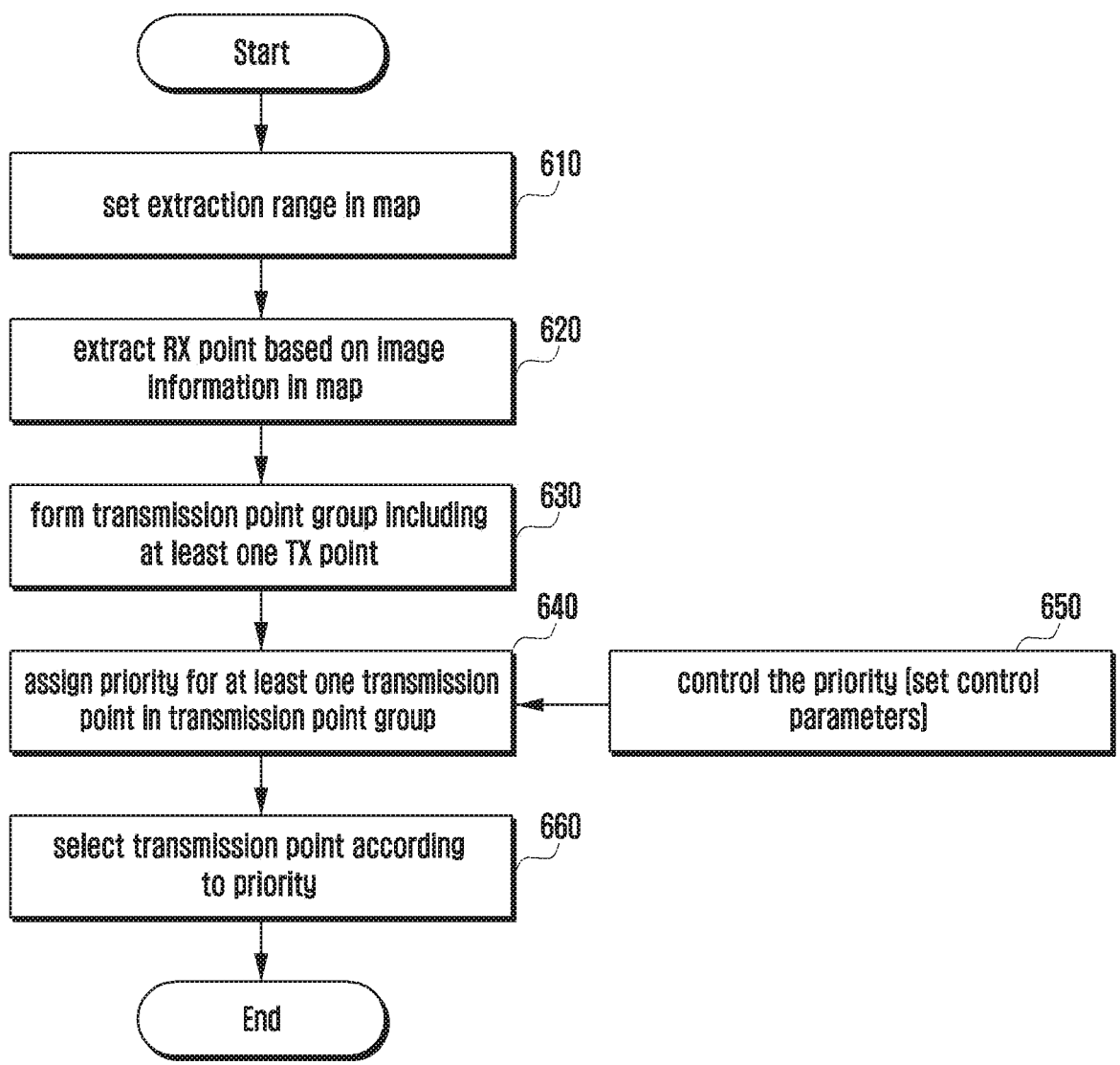
FIG. 6 describes a method for selecting a transmission point in a wireless communication system according to an embodiment of the disclosure.

FIG. 6 describes a method for selecting a transmission point in a wireless communication system according to an embodiment of the disclosure.

In one embodiment, the apparatus for selecting a transmission point in a wireless communication system may extract at least one reception point (RX point) based on the image information in a map, form a transmission point group including at least one transmission point based on the at least one reception point, assign a priority for at least one transmission point in the transmission point group, and select a transmission point according to the assigned priority. Here, the image information may be extracted based on at least one of two-dimensional map information or three-dimensional map information.

Then, the apparatus may identify signal characteristics transmitted from the selected transmission point to the at least one reception point, and design a network of the wireless communication system based on the identified signal characteristics.

Meanwhile, a storage medium may store a program including instructions configured to implement the method according to embodiments of the disclosure.

With reference to FIG. 6, at step S610, the apparatus for selecting a transmission point in a wireless communication system may set an extraction range in the map. The extraction range may be set according to a user input. The extraction range may refer to the range of a region in which the user wishes to design a network.

At step S620, the apparatus may extract a RX point based on the image information in the map. The apparatus may include an automatic reception point extraction module for recognizing specific objects (e.g., buildings, or windows) via deep learning from the image information in the area corresponding to the extraction range and extracting the positions of all reception points suitable for the objects.

At step S630, the apparatus may form a transmission point group including at least one transmission point (TX point). Here, the transmission point group may indicate a group of transmission point candidates that can be selected as a transmission point. The apparatus may include a transmission point group extraction module that extracts all possible transmission points by using the extracted reception point, image information through deep learning, and information on the existing transmission points (e.g., base station).

At step S640, the apparatus may assign a priority for at least one transmission point in the transmission point group. At step S650, the device may control the priority (e.g., set control parameters).

The priority may be assigned based on a user input. The priority may be set based on at least one of the distribution of multi-dwelling units (MDU) in the map, the distribution of single-family units (SFU) in the map, the installation cost of the transmission point, the number of transmission points to be installed, the location of previously installed transmission points, or a user input (i.e., explicit prioritization of the user).

The apparatus may generate all possible combinations of at least one transmission point included in the transmission point group (or all extracted transmission points) based on the priority set by the user.

At step S660, the apparatus may select the transmission point according to the set priority. The apparatus can calculate the weights for the generated combinations and select a transmission point according to whether the reception point is covered.

Figure 7A:
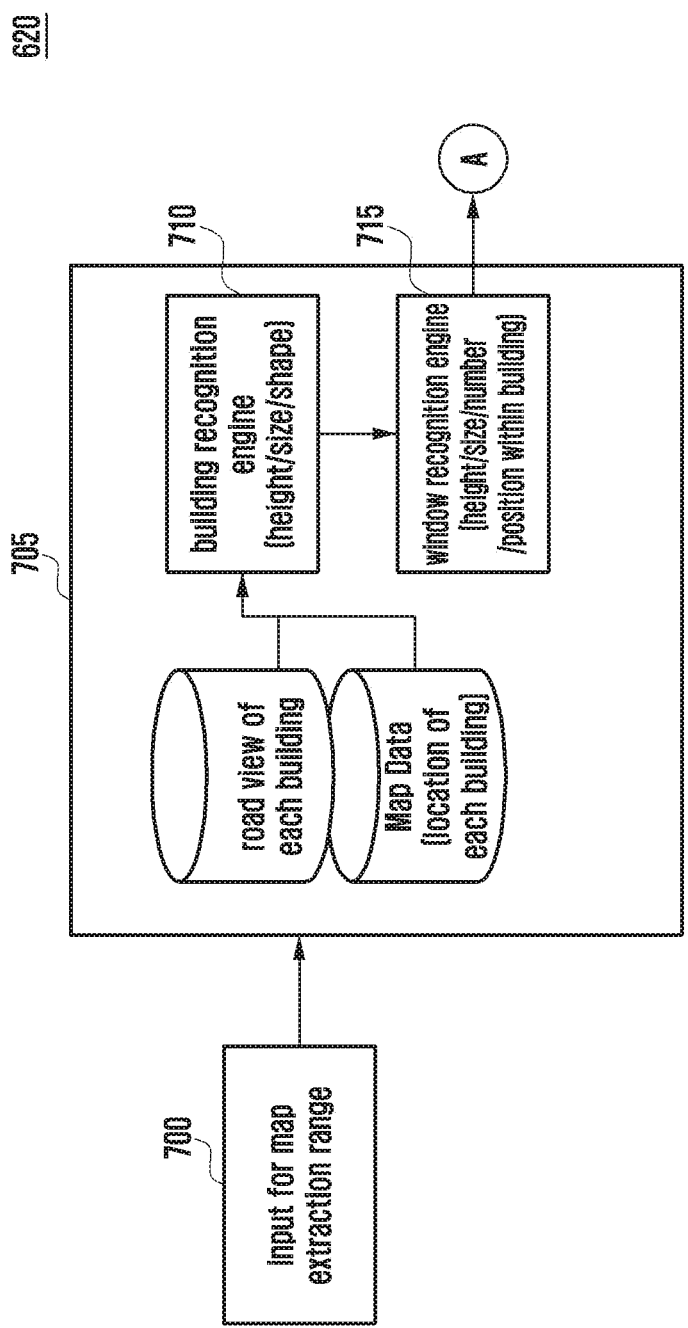
FIG. 7 depicts a process of extracting the reception point mentioned in FIG. 6 according to an embodiment of the disclosure.
Figure 7B:
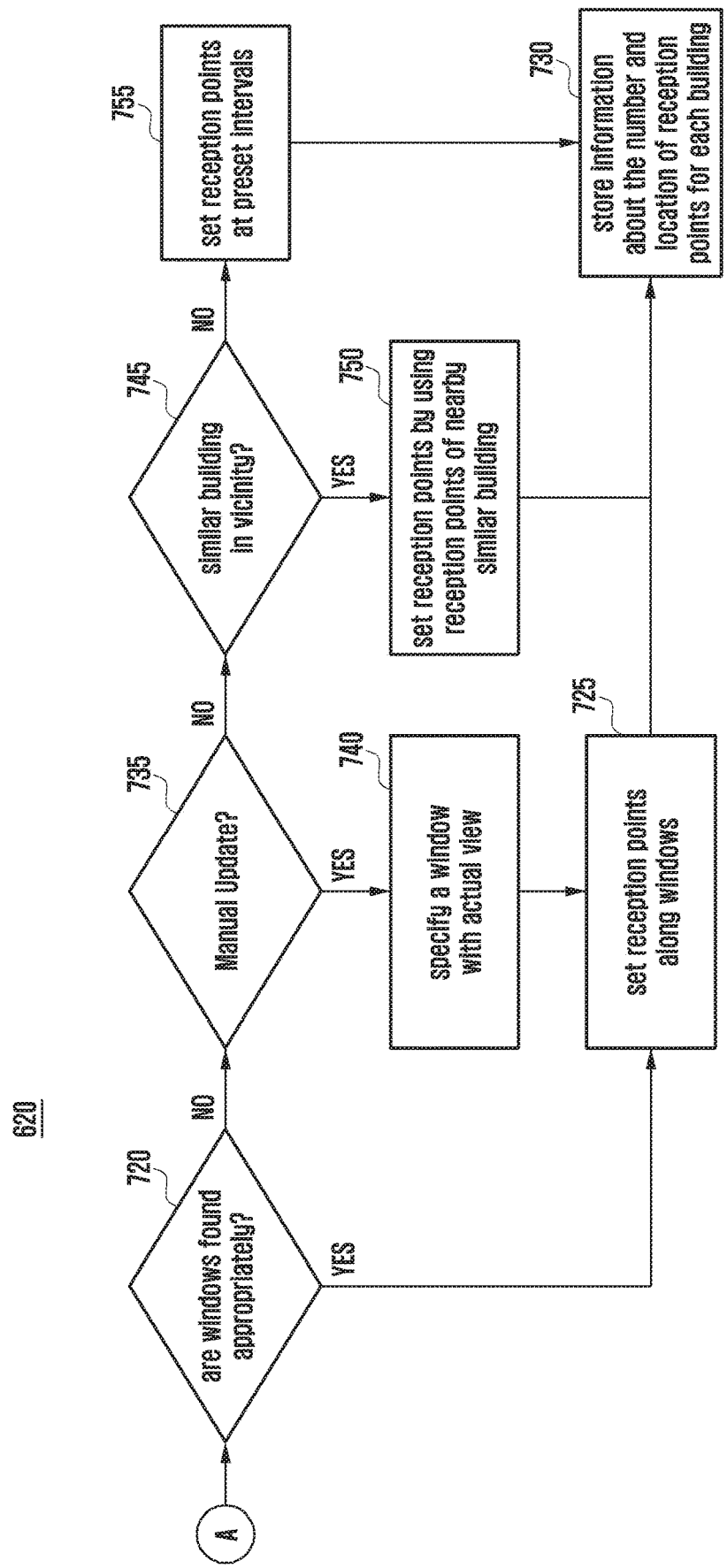

FIG. 7 depicts a process of extracting the reception point mentioned in FIG. 6 according to an embodiment of the disclosure.

Extracting at least one reception point based on the image information in the map may include: identifying the shape information of a first object located in the map based on the image information; identifying characteristic information of a second object included in the first object; and selecting the second object as the reception point based on the shape information and the characteristic information.

Here, the first object and the second object may be specified in advance by a user input or a specific algorithm, and may refer to a region where the reception point can be located in the map. The first object may physically include the second object. For example, the first object may be a building and the second object may be a window.

The first object may indicate an object suitable for receiving radio waves in the map, and the second object may indicate an object having a transmittance for radio waves lower than a threshold value. The threshold value may be a preset value and may be varied according to the propagation characteristics.

The shape information of the first object may include information about at least one of the height, the size, or the shape of the first object. The characteristic information of the second object may include information about at least one of the height, the size, the number, or the position of the second object.

In FIG. 7, for ease of description, at least one reception point is extracted by assuming that a building in the map is set as the first object and a window of the building is set as the second object. However, the disclosure is not limited thereto, and the first object and the second object may be set differently according to design specifications.

With reference to FIGS. 6 and 7, in response to a user input for the map extraction range 700, the automatic reception point extraction module may analyze the image information extracted based on at least one of the two-dimensional map information or the three-dimensional map information corresponding to the map (705).

The automatic reception point extraction module may analyze the road view of each building through deep learning and identify (or recognize) the height, size, and shape of the buildings in the map extraction range (710). For a specific building, the automatic reception point extraction module can identify (or recognize) the height, size, number, and location in the building of windows included in the building (715).

The automatic reception point extraction module may determine whether the number of recognized windows is appropriate (720). If the number of recognized windows is appropriate, the automatic reception point extraction module may set a reception point for each window (725).

If the number of recognized windows is not appropriate, the automatic reception point extraction module can initiate a manual update function (735) to specify a window to be used as a reception point in response to an input of the user viewing the actual view (740). Then, the automatic reception point extraction module may set the recognized window or the specified window as a reception point (725).

In the case where the manual update function is not provided, the automatic reception point extraction module may check whether there is a nearby building similar to the current building under consideration in terms of height, size, shape or the like in the map (745). If there is a similar building, the automatic reception point extraction module can set the reception points according to the reception points of the similar building (750). If there is no similar building, the automatic reception point extraction module can set reception points on all the surfaces of the current building at preset intervals (755).

When the reception points are set through the above procedure, the automatic reception point extraction module can confirm (or store) information about the number and location of reception points for each building (730).

Figure 8:
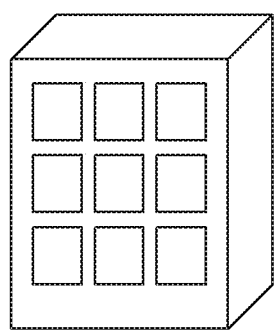
FIG. 8 shows an example of extracting the reception point as depicted in FIG. 7 according to an embodiment of the disclosure.
Figure 8:
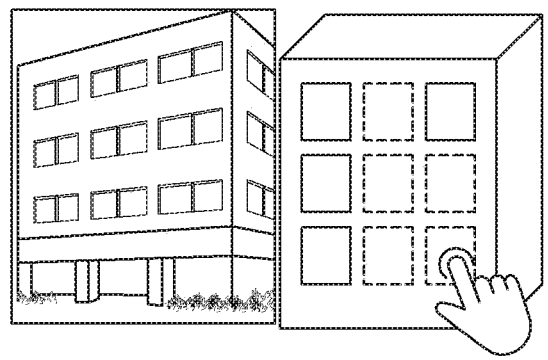
Figure 8:
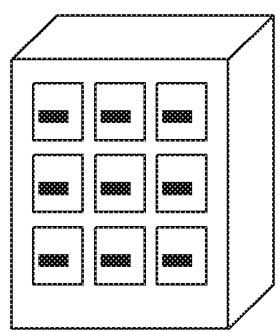
Figure 8:
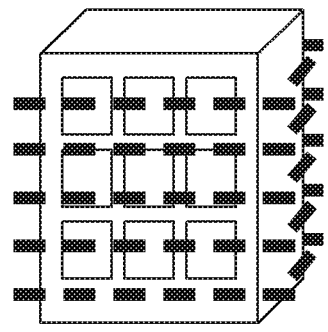

FIG. 8 shows an example of extracting the reception point as depicted in FIG. 7 according to an embodiment of the disclosure.

As shown in FIG. 7 and parts (a) and (b) of FIG. 8, if the number of recognized windows is appropriate, the automatic reception point extraction module can set the reception points along the windows.

As shown in FIG. 7 and part (c) of FIG. 8, if the number of recognized windows is not appropriate, the automatic reception point extraction module may add a window to be used as a reception point according to the manual update function initiated in response to a user input.

As shown in FIG. 7 and part (d) of FIG. 8, if there is no manual update function, the automatic reception point extraction module can set reception points at regular intervals on all sides of the building.

Figure 9:
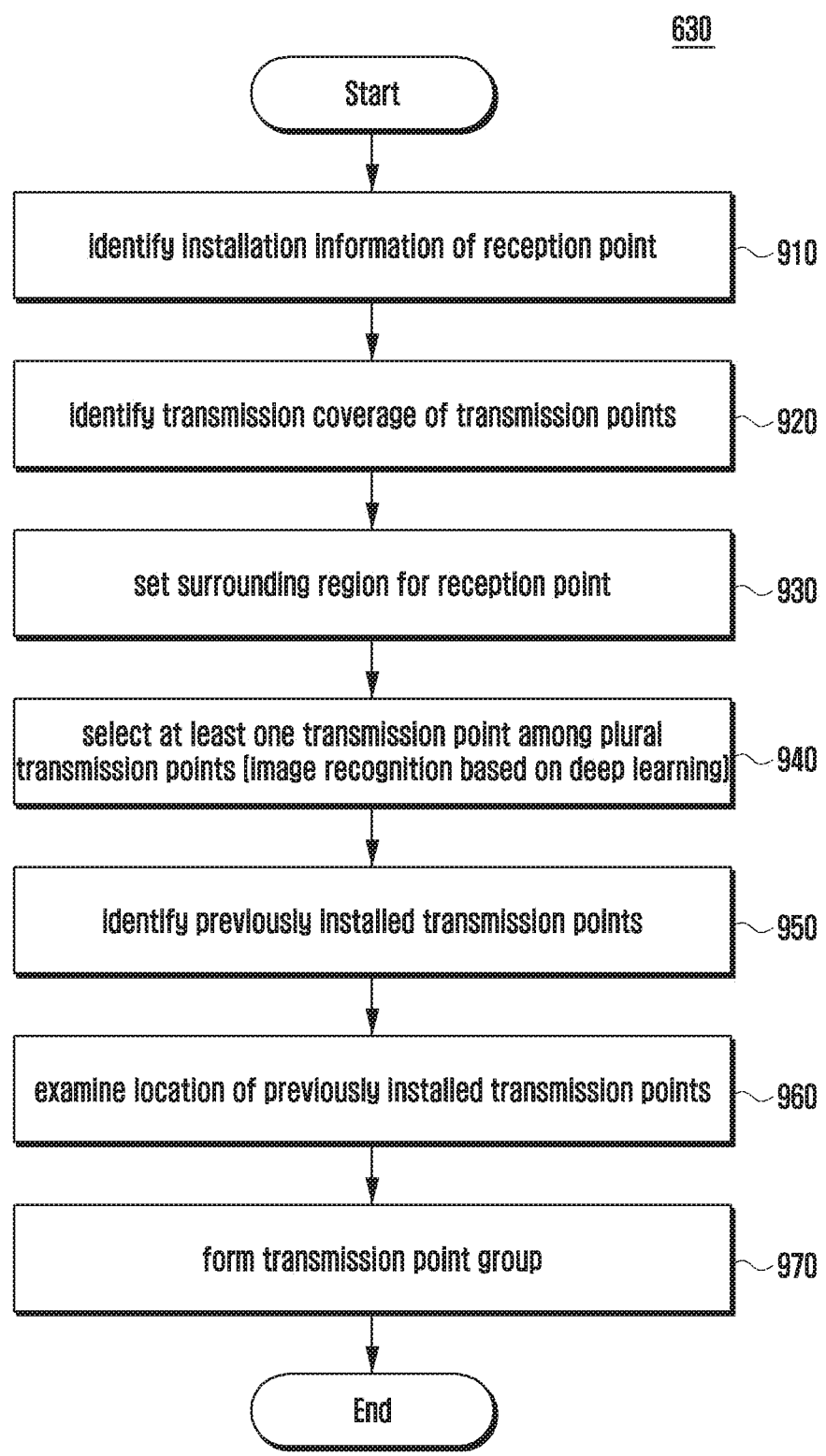
FIG. 9 illustrates a process of configuring a transmission point group mentioned in FIG. 6 according to an embodiment of the disclosure.

FIG. 9 illustrates a process of configuring a transmission point group mentioned in FIG. 6 according to an embodiment of the disclosure.

With reference to FIGS. 6 and 9, at step S910, the transmission point group extraction module may examine the installation information of at least one reception point. At step S920, the transmission point group extraction module can identify the transmission coverage of the plural transmission points. Here, the installation information may indicate the installation location and number of the reception points.

At step S930, the transmission point group extraction module may set a surrounding region for the at least one reception point based on the installation information. The surrounding region may correspond to the reception coverage of a reception point.

At step S940, the transmission point group extraction module may select at least one transmission point among the plural transmission points according to the surrounding region and the TX coverage of each transmission point through image recognition based on deep learning.

At step S950, the transmission point group extraction module may identify the location and number of previously installed transmission points. The transmission point group extraction module may examine the location and number of the previously installed transmission points at step S960, and may form a transmission point group including all or some of the at least one transmission point at step S970.

In one embodiment, the transmission point group extraction module may compare the first location of a previously installed transmission point with the second location of the at least one transmission point. If the second location can be replaced with the first location according to the comparison result, the transmission point group extraction module may include the previously installed transmission point in the transmission point group.

Figure 10:
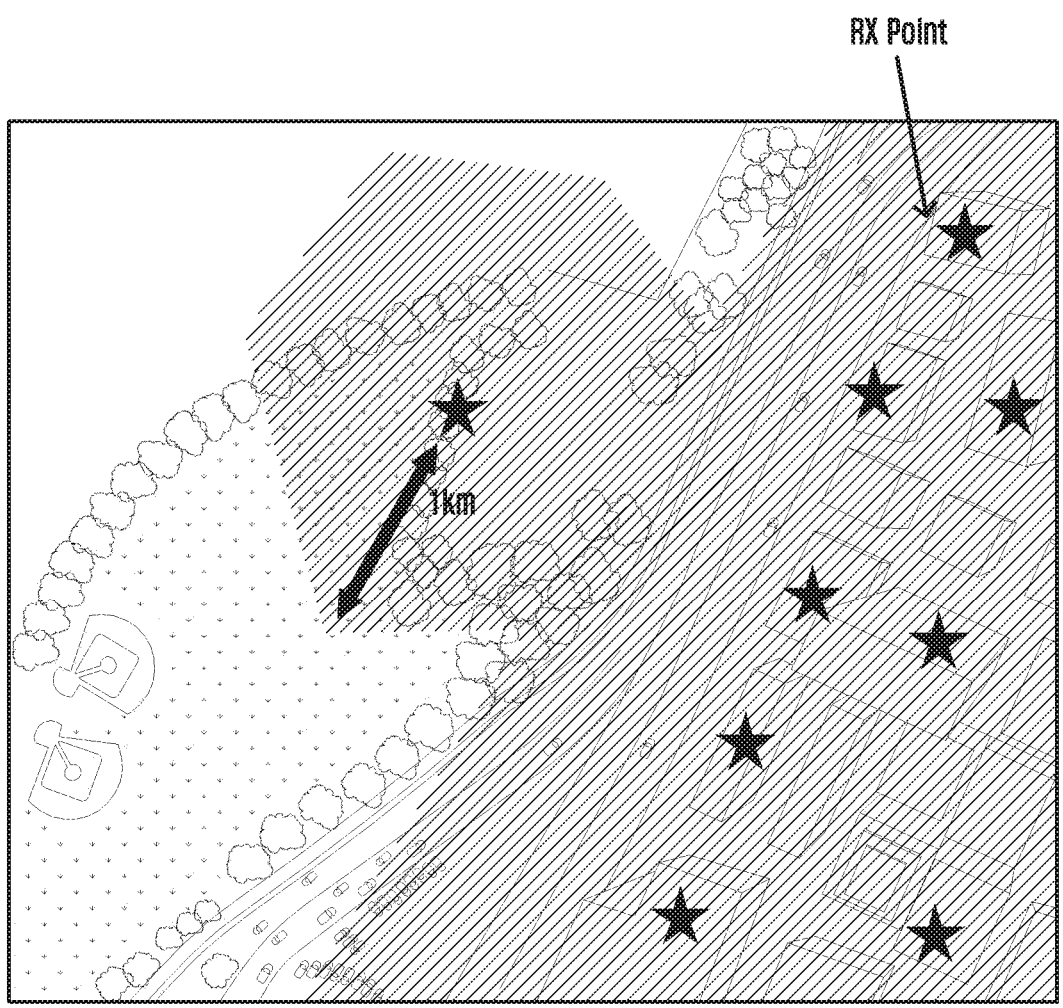
FIG. 10 shows an example of the surrounding region mentioned in FIG. 9 according to an embodiment of the disclosure.

FIG. 10 shows an example of the surrounding region mentioned in FIG. 9 according to an embodiment of the disclosure.

With reference to FIG. 10, a region within a preset distance (e.g., a radius of 1 km) from each reception point may be set as the surrounding region. Here, the preset distance may be determined in consideration of the RX coverage of the reception point.

Figure 11:
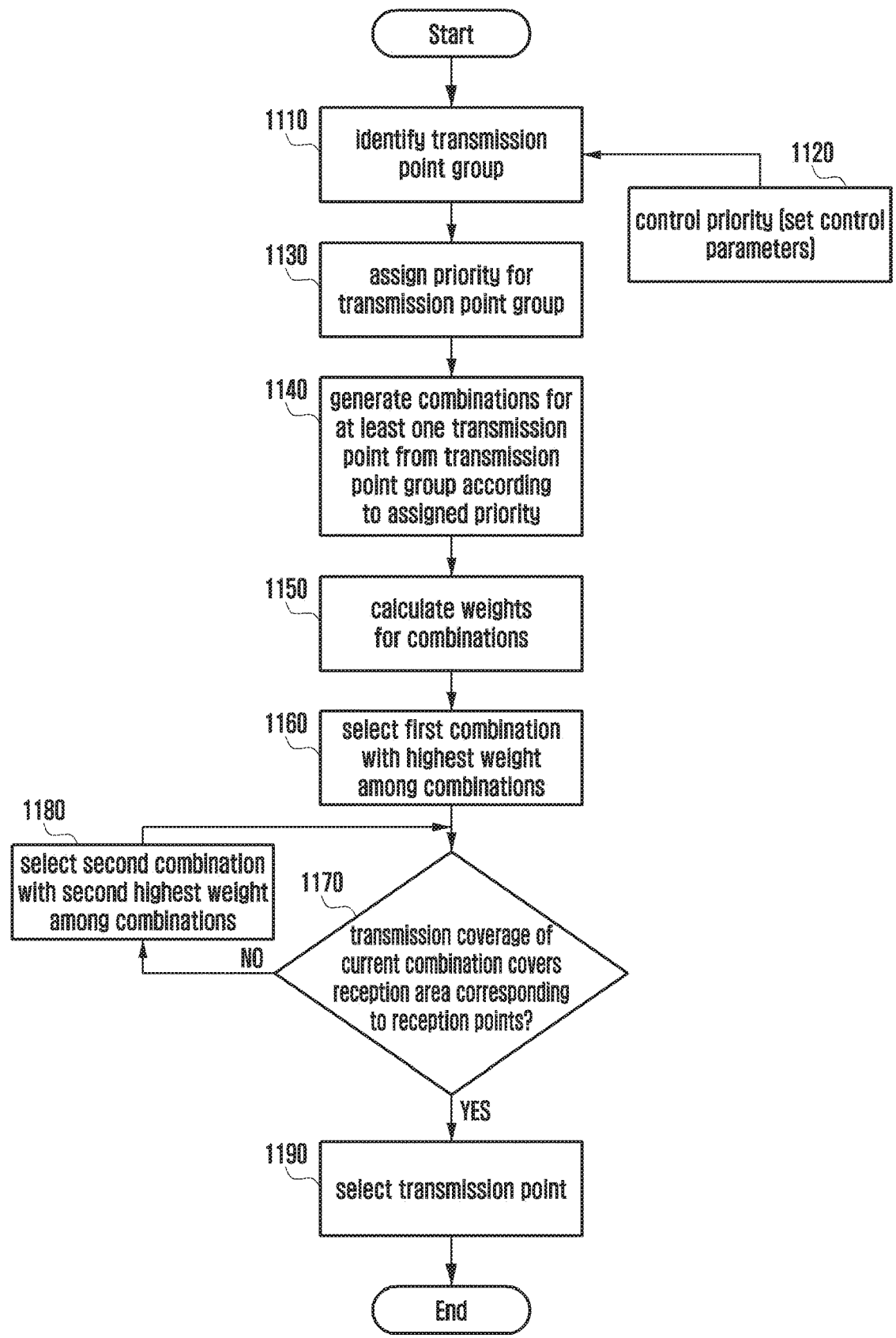
FIG. 11 illustrates a process of selecting a transmission point based on the priority mentioned in FIG. 6 according to an embodiment of the disclosure.

FIG. 11 illustrates a process of selecting a transmission point based on the priority mentioned in FIG. 6 according to an embodiment of the disclosure.

Selecting a transmission point from the transmission point group based on the assigned priority may include: generating combinations for at least one transmission point from the transmission point group according to the priority; calculating a weight for each of the combinations; selecting a first combination having the highest weight among the combinations; and, if the TX coverage of the first combination covers the reception area corresponding to the at least one reception point, selecting the first combination as the transmission point.

If the TX coverage of the first combination does not cover the reception area corresponding to the at least one reception point, selecting a transmission point may include: selecting a second combination having the second highest weight among the combinations; and, if the TX coverage of the second combination covers the reception area corresponding to the at least one reception point, selecting the second combination as the transmission point.

With reference to FIGS. 6 and 11, the apparatus for selecting a transmission point in a wireless communication system may identify a transmission point group at step S1110, and may assign priorities for transmission points in the transmission point group based on a user input at steps S1120 and S1130. In one embodiment, the priority may be determined based on a preset control parameter.

The priority may be set based on at least one of the distribution of multi-dwelling units (MDU) in the map, the distribution of single-family units (SFU) in the map, the installation cost of the transmission point, the number of transmission points to be installed, the location of previously installed transmission points, or a user input (i.e., explicit prioritization of the user).

The apparatus may generate combinations for at least one transmission point from the transmission point group according to the assigned priority at step S1140, and may calculate weights for the combinations at step S1150.

The apparatus may select a first combination having the highest weight among the combinations at step S1160. The apparatus may determine whether the transmission coverage of the current combination (e.g., first combination) covers the reception area corresponding to the reception points at step S1170.

If the transmission coverage of the first combination does not cover the reception area corresponding to the reception points, the apparatus may select a second combination having the second highest weight among the combinations at step S1180.

If the transmission coverage of the first combination covers the reception area corresponding to the reception points, the apparatus may select at least one transmission point corresponding to the first combination at step S1190. After step S1180, if the transmission coverage of the second combination covers the reception area corresponding to the reception points, the apparatus may select at least one transmission point corresponding to the second combination at step S1190.

Figure 12A:
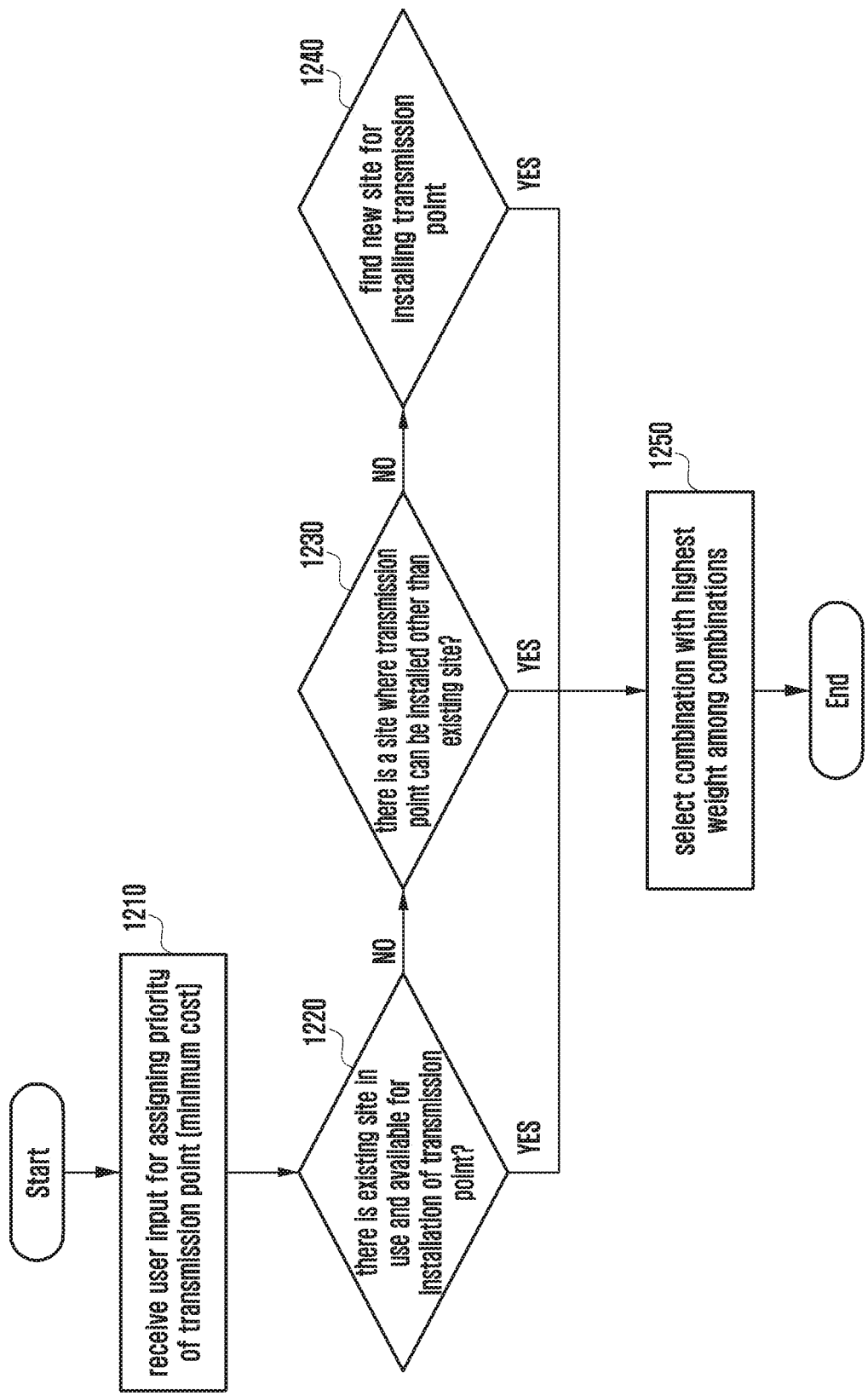
FIG. 12 shows an example of the transmission point selection process described in FIG. 11 according to an embodiment of the disclosure.

FIGS. 12A and 12B show an example of the transmission point selection process described in FIG. 11 according to an embodiment of the disclosure.

In FIG. 12A, the user assigns the priority for a transmission point in consideration of the minimum cost.

In one embodiment, at step S1210, the transmission point selection apparatus may receive a user input for selecting "minimum cost" to assign the priority for the transmission point.

At step S1220, the apparatus can check whether there is an existing site in use and available for installation of the transmission point. Because the minimum cost is considered for selecting the transmission point, the apparatus can take account of utilizing the existing site as a top priority.

If it is difficult to utilize the existing site, at step S1230, the apparatus can check whether there is a site where the transmission point can be installed other than the existing site. For example, the site where the transmission point can be installed may be a utility pole, a roof top, a light pole, or a tower.

If there is no site where the transmission point can be installed, at step S1240, the apparatus can find a new site for installing the transmission point. For example, the new installation site may be a new pole or an intersection.

For example, if the transmission point is installed at the existing site, the rental cost and installation cost are not incurred. If the transmission point is installed at an available site other than the existing site, no installation cost is incurred but the rental cost may be incurred. If the transmission point is installed at a new site, both the rental cost and installation cost may be incurred.

FIG. 12B is a table showing an example of assigning the priority for the transmission point site according to a user input (minimum cost, MDU, or SFU) for priority assignment.

In the first method (Method #0), as the user has selected the minimum cost as a criterion for assigning the priority of the transmission point location, the first priority is assigned to the existing place (existing site, or existing tower), the second priority is assigned to a place where a transmission point can be installed other than the existing place (utility pole, roof top, or light pole), and the third priority is assigned to a new installation site (new pole).

In the second method (Method #1), the user has selected "MDU (multi-dwelling unit)" as a criterion for assigning the priority of the transmission point location, and the priority can be assigned as shown in the table. Here, the user having selected "MDU" may indicate that the region for installing the transmission point is an area where the MDUs are densely distributed.

In the third method (Method #2), the user has selected "SFU (single-family unit)" as a criterion for assigning the priority of the transmission point location, and the priority can be assigned as shown in the table. Here, the user having selected "SFU" may indicate that the region for installing the transmission point is an area where the SFUs are densely distributed.

Figure 13A:
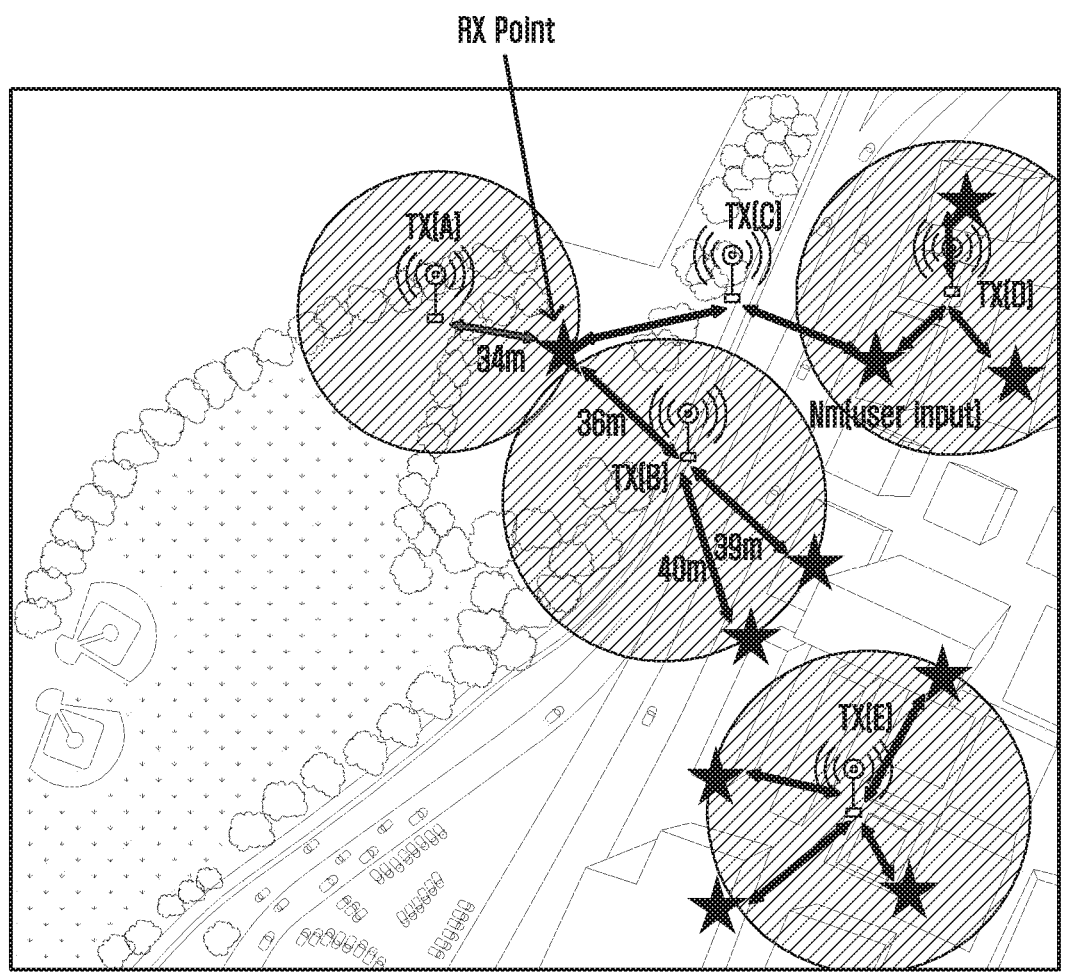
FIGS. 13A and 13B show an example of selecting a transmission point according to an embodiment of the disclosure.
Figure 13B:
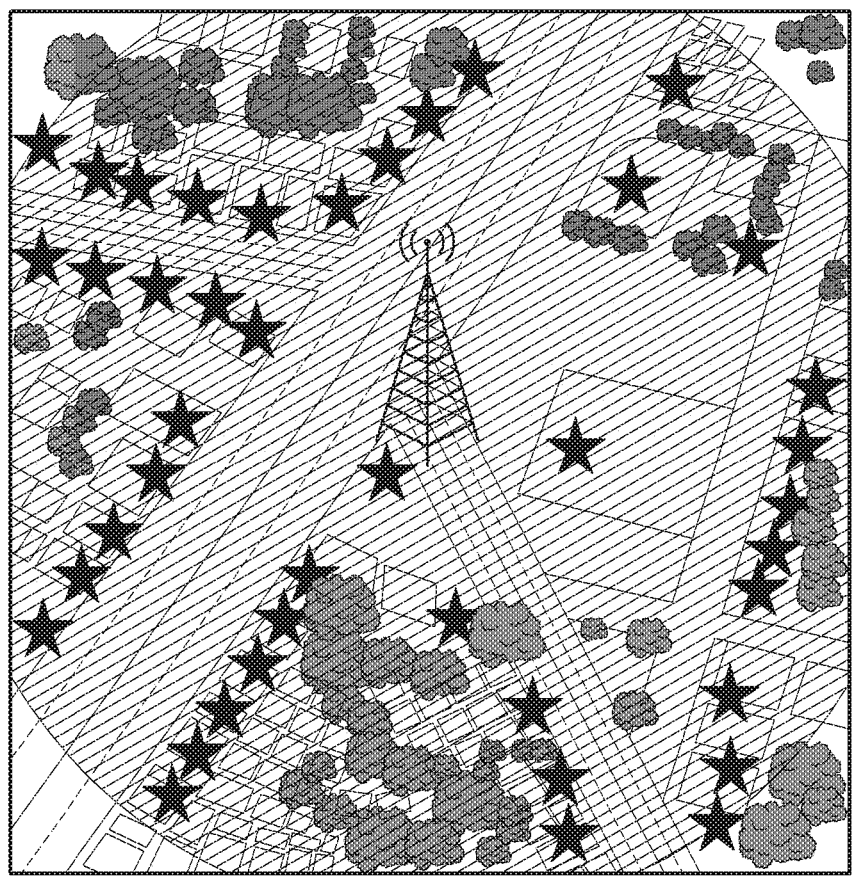

FIGS. 13A and 13B show an example of selecting a transmission point according to an embodiment of the disclosure.

In FIGS. 13A and 13B, the transmission point can be selected according to the following optimum combination selection criteria. FIG. 13A shows a case of selecting the transmission point when the user selects "MDU", and FIG. 13B shows a case of selecting the transmission point when the user selects "SFU".

<Criteria For Selecting Optimal Combination>

1. Coverage distance according to selection option (coverage distance varies according to user's choice, 40 m for MDU, 400 m for SFU)

2. Number of RX points connected to each TX point

3. Sum of the distances of all TX points<->RX points connected to each TX point

It is possible to select a combination of at least one transmission point determined as the optimal combination according to the above optimal combination selection criteria.

For example, in FIG. 12A, the first TX point TX(A) is connected to one RX point, in which the sum of the distances of all TX points<->RX points is 34 m. The second TX point TX(B) is connected to three RX points, in which the sum of the distances of all TX points<->RX points is 115 m (36+40+39). The third TX point TX(C) is connected to two RX points, in which the sum of the distances of all TX points<->RX points is 79 m. The fourth TX point TX(D) is connected to three RX points, in which the sum of the distances of all TX points <->RX points is 66 m (24+19+23).

Here, the MDU can cover up to 40 m. For the third TX point TX(C) and the fourth TX point TX(D), if the third TX point TX(C) is selected, it cannot cover the RX point at the right end, and hence the fourth TX point TX(D) can be selected. Therefore, for example, if TX(B, D, E) are selected, the final TX(B, D, E) are designated as a TX point candidate group combination.

Figure 14:
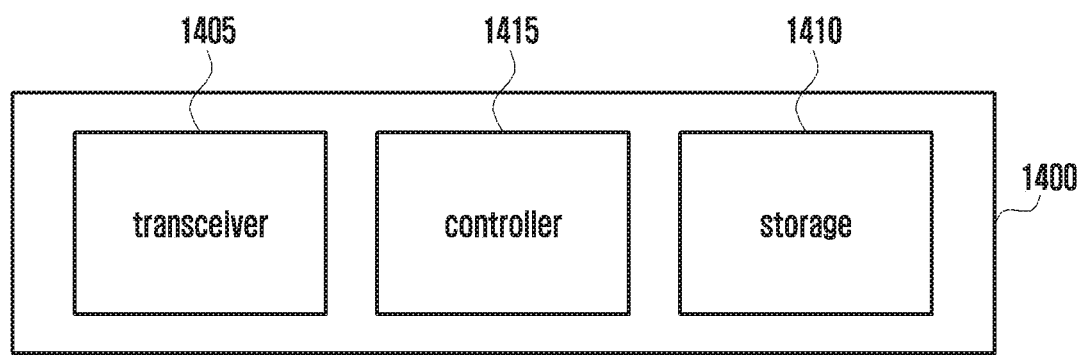
FIG. 14 is a block diagram of an apparatus for selecting a transmission point in a wireless communication system according to an embodiment of the disclosure.

FIG. 14 is a block diagram of an apparatus for selecting a transmission point in a wireless communication system according to an embodiment of the disclosure.

With reference to FIG. 14, according to embodiments of the disclosure, the apparatus 1400 for selecting a transmission point in a wireless communication system may include a transceiver 1405, a storage 1410, and a controller 1415.

The transceiver 1405 can transmit and receive signals to and from other devices outside the apparatus 1400. More specifically, the transceiver 1405 can transmit and receive data to and from an external device, and may include an interface for data transmission and reception.

The storage 1410 may store at least one of information related to the apparatus 1400 or information transmitted and received through the transceiver 1405. The storage 1410 may also store all information needed for the simulation in the embodiments herein, such as information about the simulation results, information about the shape (size, height, or position) of the objects in the map obtained by image analysis, two-dimensional map information, three-dimensional map information, and information on the shape of objects mapped to the map. Based on at least one of the simulation result or the comparison result, new information may be added to the information stored in the storage 1410, or some of the information stored in the storage 1410 may be deleted or updated.

The controller 1415 can control the overall operation of the apparatus 1400, and can control the apparatus to perform operations described in the above embodiments. The controller 1415 may be configured to extract at least one reception point (RX point) based on the image information in a map, form a transmission point group including at least one transmission point based on the at least one reception point, assign a priority for at least one transmission point in the transmission point group, and select an optimal transmission point according to the assigned priority.

The controller 1415 may include at least one processor. The at least one processor may be controlled by a program that includes instructions configured to implement the method described in the embodiments of the disclosure. The program may be stored in a storage medium, which may include volatile or nonvolatile memory. This memory may be a medium capable of storing data, and there is no restriction on the type of the medium if the instructions can be stored.

Hereinabove, embodiments of the disclosure have been described with reference to the accompanying drawings. Specific terms or words used in the description should be construed in accordance with the spirit of the disclosure without limiting the subject matter thereof It should be understood that many variations and modifications of the basic inventive concept described herein will still fall within the spirit and scope of the disclosure as defined in the appended claims and their equivalents.

What is claimed is:

1. A method executed by an apparatus in a wireless communication system for generating reception/transmission position candidates required for a tracing simulation step in network design, the method comprising:
   obtaining two-dimensional image information and three-dimensional map information of a map for the network design;
   identifying the three-dimensional map information corresponding to the two-dimensional image information;
   acquiring one or more characteristics of at least one object from the two-dimensional image information, wherein the one or more characteristics of the at least one object are mapped to corresponding objects displayed on the map;
   extracting at least one reception point based on the one or more characteristics of the at least one object;
   forming a transmission point group including at least one transmission point based on the at least one reception point and a reception coverage of the at least one reception point; and
   assigning a priority for at least one transmission point in the transmission point group and selecting a transmission point according to the assigned priority.

2. The method of claim 1, wherein extracting at least one reception point comprises:
   identifying shape information of a first object located in the map based on the two-dimensional image information;
   identifying characteristic information of a second object included in the first object; and
   selecting the second object as the reception point based on the shape information and the characteristic information.

3. The method of claim 2,
   wherein the shape information comprises information about at least one of a height, a size, or a shape of the first object, and
   wherein the characteristic information comprises information about at least one of a height, a size, a number, or a position of the second object.

4. The method of claim 2, wherein the second object is an object having a transmittance for radio waves lower than a threshold value.

5. The method of claim 1, wherein the priority is assigned based on at least one of a distribution of multi-dwelling units (MDU) in the map, a distribution of single-family units (SFU) in the map, an installation cost of the transmission point, a number of transmission points to be installed, a location of previously installed transmission points, or a user input.

6. The method of claim 1, wherein forming a transmission point group comprises:
   examining installation information of the at least one reception point;
   configuring a surrounding region for the at least one reception point based on the installation information; and
   selecting at least one transmission point from among plural transmission points based on the surrounding region and a transmission coverage of each of the transmission points.

7. The method of claim 6, wherein forming a transmission point group further comprises:
   comparing a first location of a previously installed transmission point with a second location of the at least one transmission point; and
   configuring the previously installed transmission point as the at least one transmission point if the second location is replaceable with the first location according to the comparison result.

8. The method of claim 1, wherein selecting a transmission point comprises:
   generating combinations for the at least one transmission point from the transmission point group according to the priority;
   calculating a weight for each of the combinations;
   selecting a first combination having a highest weight among the combinations; and
   selecting, if a transmission coverage of the first combination covers a reception area corresponding to the at least one reception point, the first combination as the transmission point.

9. The method of claim 8, wherein selecting a transmission point comprises:
   selecting, if the transmission coverage of the first combination does not cover the reception area corresponding to the at least one reception point, a second combination having a second highest weight among the combinations; and
   selecting, if the transmission coverage of the second combination covers the reception area corresponding to the at least one reception point, the second combination as the transmission point.

10. The method of claim 1, further comprising:
    identifying characteristics of a signal transmitted from the selected transmission point to the at least one reception point; and
    designing a network of the wireless communication system based on the identified signal characteristics.

11. The method of claim 1, wherein the two-dimensional image information is determined based on at least one of two-dimensional map information or the three-dimensional map information of the map.

12. A non-transitory storage medium storing a program that includes instructions that when executed by at least one processor of an apparatus perform the method of claim 1.

13. An apparatus for selecting a transmission (TX) point in a wireless communication system, comprising:
    a transceiver configured to transmit and receive information; and
    a controller configured to:
        obtain two-dimensional image information and three-dimensional map information of a map for network design;
        identify the three-dimensional map information corresponding to the two-dimensional image information;
        acquire one or more characteristics of at least one object from the two-dimensional image information, wherein the one or more characteristics of the at least one object are mapped to corresponding objects displayed on the map;
        extract at least one reception point based on the one or more characteristics of the at least one object;
        form a transmission point group including at least one transmission point based on the at least one reception point and a reception coverage of the at least one reception point; and
        assign a priority for at least one transmission point in the transmission point group and selecting a transmission point according to the assigned priority.

14. The apparatus of claim 13, wherein the controller is further configured to:
- identify shape information of a first object located in the map based on the two-dimensional image information,
- identify characteristic information of a second object included in the first object, and
- select the second object as the reception point based on the shape information and the characteristic information.

15. The apparatus of claim 14,
- wherein the shape information comprises information about at least one of a height, a size, or a shape of the first object, and
- wherein the characteristic information comprises information about at least one of a height, a size, a number, or a position of the second object.

* * * * *